US009077700B2

(12) United States Patent
Tanaka et al.

(10) Patent No.: US 9,077,700 B2
(45) Date of Patent: Jul. 7, 2015

(54) AUTHENTICATION SERVER, AUTHENTICATION METHOD AND COMPUTER PROGRAM

(71) Applicants: Yasuyuki Tanaka, Kanagawa-ken (JP); Yoshihiro Oba, Kanagawa-ken (JP); Mitsuru Kanda, Tokyo (JP)

(72) Inventors: Yasuyuki Tanaka, Kanagawa-ken (JP); Yoshihiro Oba, Kanagawa-ken (JP); Mitsuru Kanda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/709,471

(22) Filed: Dec. 10, 2012

(65) Prior Publication Data
US 2013/0174221 A1    Jul. 4, 2013

(30) Foreign Application Priority Data

Dec. 28, 2011    (JP) .................................. 2011-288881

(51) Int. Cl.
*H04L 29/06*    (2006.01)
(52) U.S. Cl.
CPC ............ *H04L 63/08* (2013.01); *H04L 63/0884* (2013.01)
(58) Field of Classification Search
CPC ......... H04L 63/00; H04L 65/00; H04L 63/04; H04L 63/08; H04L 65/14; H04L 63/0884; H04L 29/06
USPC ......... 713/155, 161, 168, 169, 170, 176, 123; 726/2; 380/229, 232, 247
See application file for complete search history.

(56) References Cited

U.S. PATENT DOCUMENTS

| 7,694,015 | B2 * | 4/2010 | Yoshiuchi et al. ............ 709/244 |
| 2004/0230830 | A1 * | 11/2004 | Ogawa et al. ................. 713/200 |
| 2005/0055552 | A1 * | 3/2005 | Shigeeda ....................... 713/171 |
| 2005/0157722 | A1 | 7/2005 | Yoshimoto et al. |
| 2010/0125892 | A1 | 5/2010 | Tanizawa |
| 2010/0217990 | A1 * | 8/2010 | Abe et al. ...................... 713/176 |

FOREIGN PATENT DOCUMENTS

| JP | 2005-204189 | 7/2005 |
| JP | 2010-122763 | 6/2010 |

OTHER PUBLICATIONS

Duffy et al, Internet Engineering Task Force (IETF) Request for Comments, 6345, Category: Standards Track, ISSN: 2070-1721.
Office Action of Notification of Reason for Rejection for Japanese Patent Application No. 2011-288881, Dated Sep. 24, 2014, 4 pages.

* cited by examiner

*Primary Examiner* — Chau Le
*Assistant Examiner* — Muhammad Chaudhry
(74) *Attorney, Agent, or Firm* — Amin, Turocy & Watson, LLP

(57) ABSTRACT

There is provided an authentication server including: a network access authenticating unit and an address notifying unit wherein the network access authenticating unit receives, from an authentication relay connected to a network, a first authentication message for a communication device existing under the authentication relay, and execute network access authentication process with the communication device, and the address notifying unit notifies the communication device of the server's address information in accordance with a result of the network access authentication process.

9 Claims, 8 Drawing Sheets

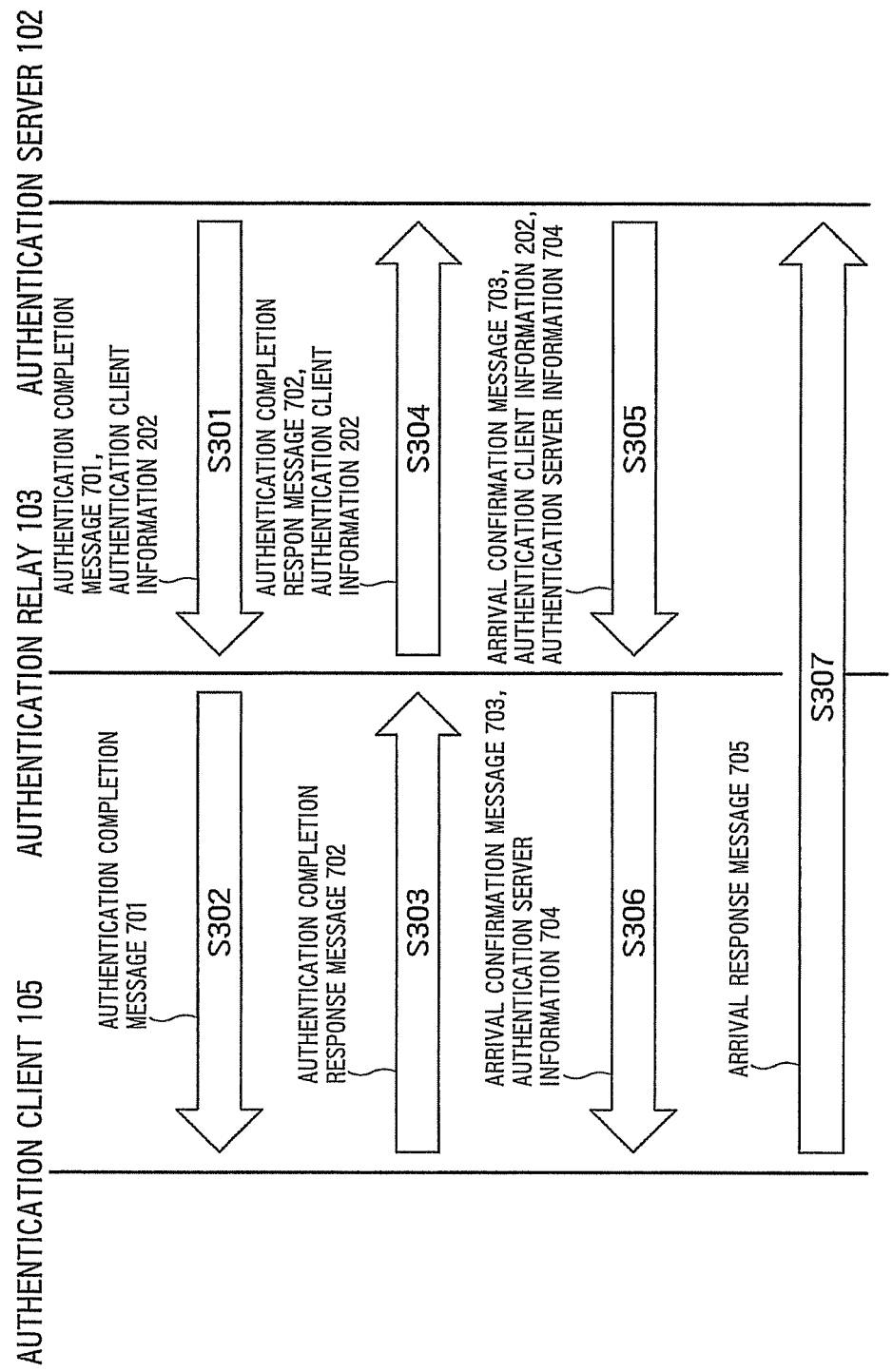

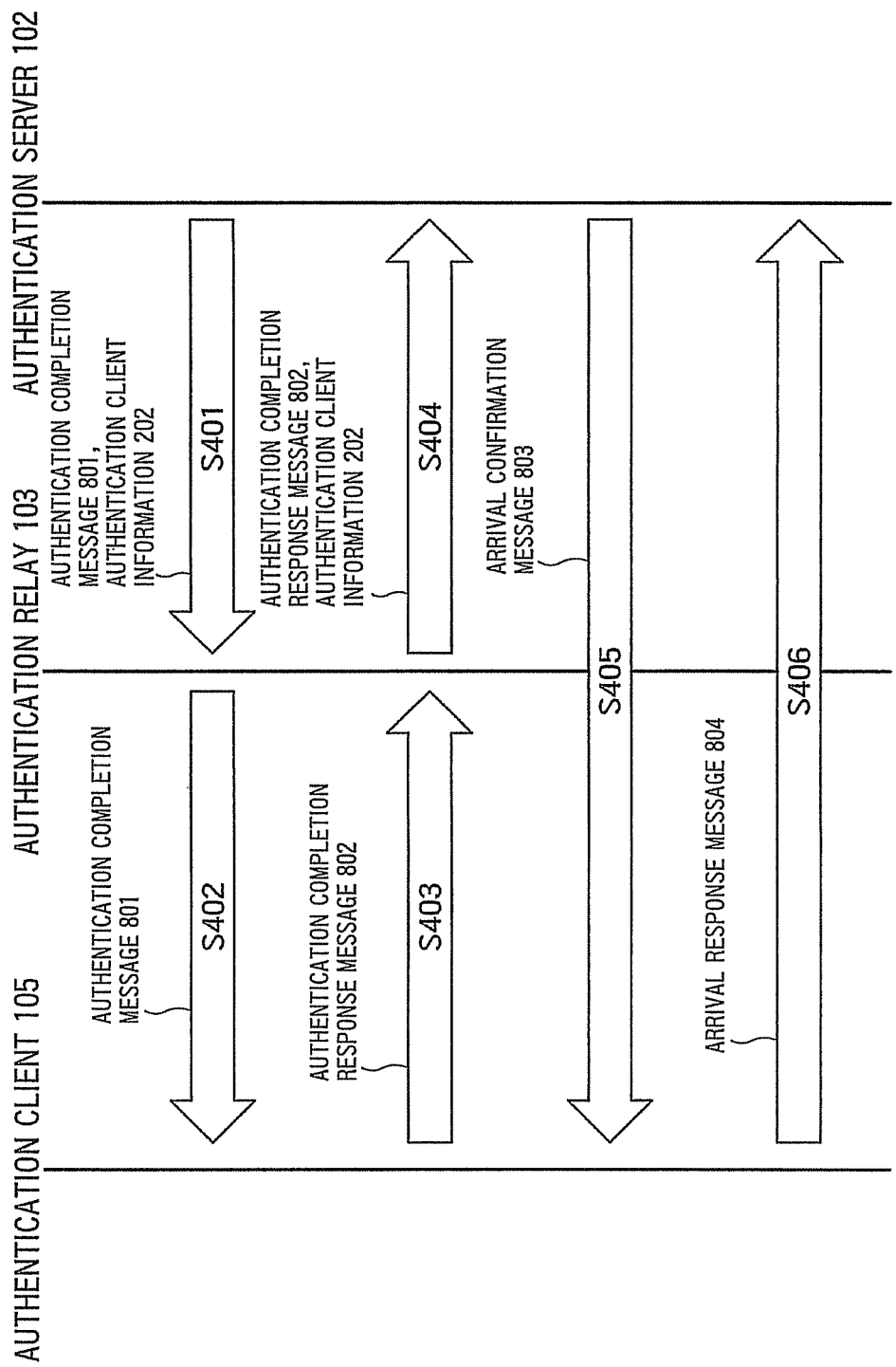

AUTHENTICATION SERVER, AUTHENTICATION METHOD AND COMPUTER PROGRAM

CROSS REFERENCE TO RELATED APPLICATIONS

This application is based upon and claims the benefit of priority from the prior Japanese Patent Application No. 2011-288881, filed on Dec. 28, 2011, the entire contents of which are incorporated herein by reference.

FIELD

Embodiments described herein relate to an authentication server for executing a network access authentication process and an authentication method therefor, and a computer readable medium storing a computer program.

BACKGROUND

Such a case exists that an authentication client residing as a subordinate under a certain authentication relay moves under another authentication relay after executing a network access authentication process with an authentication server via the authentication relay. In the case of moving to another authentication relay, a re-authentication procedure (update of the authentication) is to occur under another authentication relay.

Even when both of a certain authentication relay and another authentication relay belong to the same authentication domain, however, the re-authentication process may get into a failure. This case entails redoing the authentication process from the beginning under another authentication relay, and such problems arise that a processing load on an authentication relay increases, a data size (traffic) across a network rises, and communication of the authentication client resume with a delay. Accordingly, also when the authentication client moves to another authentication relay, it is desirable to ensure the re-authentication process. Further, even in a case where the authentication client does not move to another authentication relay, it is desirable to enable the re-authentication process to be executed while decreasing the load on the authentication relay.

BRIEF DESCRIPTION OF THE DRAWINGS

FIG. 7 is a diagram illustrating the notification method of the address information of the authentication server in a third embodiment; and FIG. 8 is a diagram illustrating the notification method of the address information of the authentication server in a fourth embodiment.

DETAILED DESCRIPTION

According to some embodiments, there is provided an authentication server including: a network access authenticating unit and an address notifying unit.

The network access authenticating unit receives, from an authentication relay connected to a network, a first authentication message for a communication device existing under the authentication relay, and executes network access authentication process with the communication device.

The address notifying unit notifies the communication device of the server's address information in accordance with a result of the network access authentication process.

Hereinafter, embodiments will be described with reference to the drawings.

First Embodiment

Figure 1:
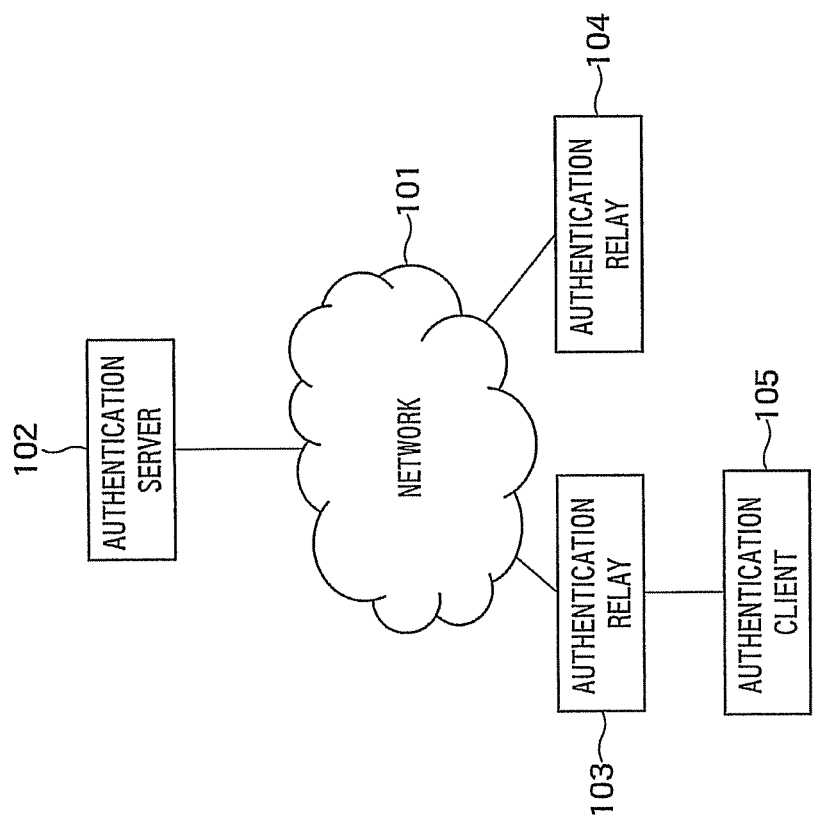
FIG. 1 is a diagram illustrating a topology of a network including an authentication server according to a first embodiment.

FIG. 1 depicts a configuration of a network including an authentication server according to a first embodiment.

An authentication server 102, an authentication relay 103 and an authentication relay 104 are connected to a network 101. An authentication client 105 resides as a subordinate under the authentication relay 103. A device (e.g., a correspondent device with which the authentication client undergoing an authentication process performs communication) not illustrated in FIG. 1 is also connected to the network 101 via an unillustrated authentication relay or directly. But, the correspondent device does not relate to essentiality of the first embodiment directly, and hence its description is omitted. The authentication relay may be built in, e.g., a wireless base station etc.

The authentication client 105 needs to succeed in a network access authentication for performing the communication with the correspondent device. The network access authentication process is executed between the authentication client 105 and the authentication server 102. Till succeeding in the network access authentication, the authentication client 105 is disabled from connecting to the network 101 and therefore conducts the network access authentication with the authentication server 102 via the authentication relay 103.

Hereafter, the discussion will be made on the assumption that the PANA protocol defined by RFC5191 is used as a network access authentication protocol, and an operation of the authentication relay is pursuant to RFC6345. The protocol for use and the communication method are not, however, limited to those described above.

Figure 2:
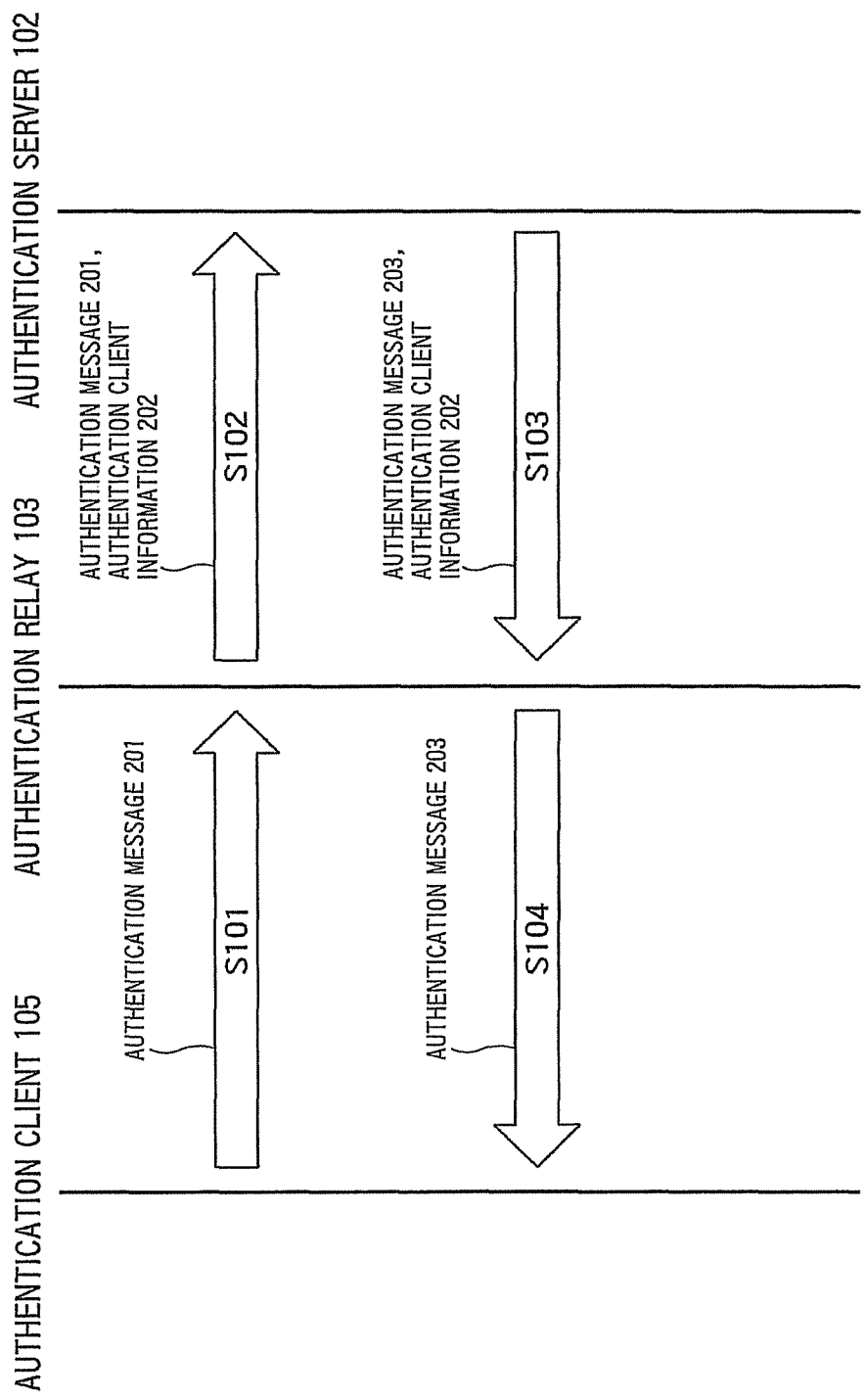
FIG. 2 is a diagram illustrating an outline of how an authentication message is transmitted and received via an authentication relay.

FIG. 2 illustrates an outline of the network access authentication process via the authentication relay 103.

The authentication client 105 transmits an authentication message 201 to the authentication relay 103 (S101). A source address of the authentication message 201 is set to the authentication client 105, while a destination address is set to the authentication relay 103.

The authentication relay 103 receiving the authentication message 201 transmits the authentication message 201 to the authentication server 102 in a way that authentication client information 202 is contained in the authentication message 201 (S102). The authentication client information 202 contains items of address information (an IP address, a usage port number, etc.) of the authentication client 105. The address information, though containing the IP address and the usage port number herein, may contain only the IP address if the usage port number is fixed and so on. Further, the IP address is used as an address for the communication in the first embodiment; however, the address may also be an address based on another protocol. The source address of the authentication client information 202 to be transmitted to the authentication server 102 is set to the authentication relay 103, while the destination address is set to the authentication server 102.

The authentication server 102 receiving the authentication message 201 containing the authentication client information 202 recognizes the authentication client 105 from the authentication client information 202. Then, the authentication server 102 executes, based on contents of the authentication message 201, the network access authentication process for the authentication client 105. On this occasion, the items of information such as the IP address and the port number contained in the authentication client information 202 are used as the address information of the authentication client. The network access authentication is conducted based on, e.g., a pre-shared key with the authentication client 105 or a password, an electronic certificate, etc.

The authentication server 102 generates an authentication message 203 according to a result of the network access authentication process, and transmits the authentication message 203 to the authentication relay 103 in a way that the authentication client information 202 is contained in this authentication message 203 (S103). The source address of the authentication message 203 is set to the authentication server 102, while the destination address is set to the authentication relay 103.

The authentication relay 103 receiving the authentication message 203 containing the authentication client information 202 acquires the IP address and the port number of the authentication client 105 from the authentication client information 202, thereby specifying the authentication client 105. The authentication relay 103 transmits the authentication message 203 to the authentication client 105 (S104). The authentication message 203 may not contain the authentication client information 202. The source address of the authentication message 203 to be transmitted to the authentication client 105 is set to the authentication relay 103, while the destination address is set to the authentication client 105.

Through the processing described above, the authentication client 105 and the authentication server 102 execute the network access authentication process via the authentication relay 103.

Figure 3:
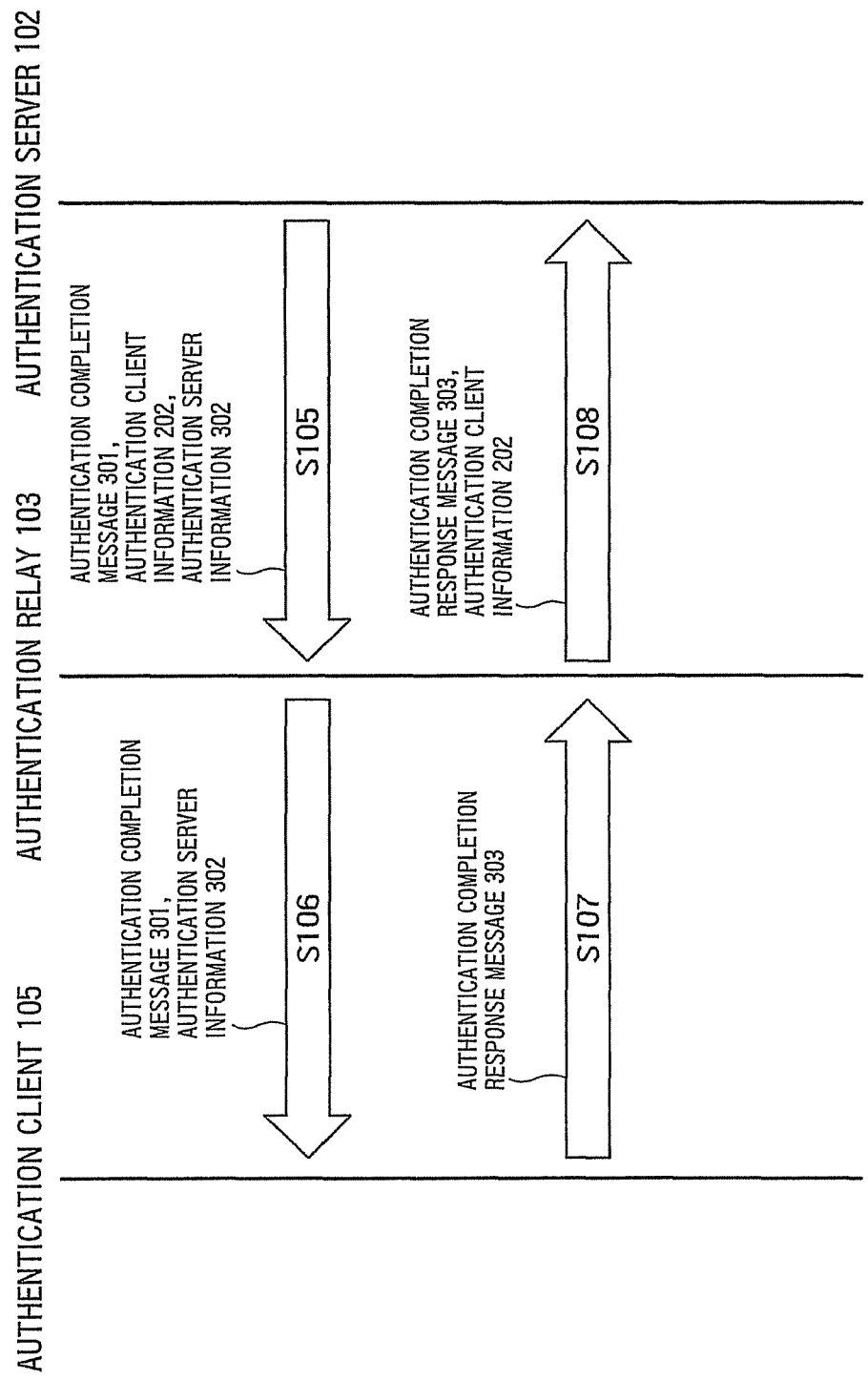
FIG. 3 is a diagram illustrating a notification method of address information of the authentication server in the first embodiment.

FIG. 3 illustrates a flow of transmitting and receiving the messages when completing the network access authentication process.

If the authentication server 102 succeeds in the authentication for the authentication client 105, or if the authentication server 102 and the authentication client 105 succeed in authenticating each other, the authentication server 102 transmits an authentication completion message 301 to the authentication relay 103 (S105).

At this time, the authentication server 102 puts the authentication client information 202 and authentication server information 302 into the authentication completion message 301. The authentication server information 302 contains, e.g., the IP address and the usage port number of the authentication server 102. The usage port number, if previously determined, may not be contained therein. The source address of the authentication completion message 301 is set to the authentication server 102, while the destination address is set to the authentication relay 103.

The authentication relay 103 specifies the authentication client 105 on the basis of the authentication client information 202 received from the authentication server 102, and transmits the authentication completion message 301 containing the authentication server information 302 to the authentication client 105 (S106). The source address of the authentication completion message 301 to be transmitted to the authentication client 105 is set to the authentication relay 103, while the destination address is set to the authentication client 105.

The authentication client 105, upon receiving the authentication completion message 301 containing the authentication server information 302, transmits an authentication completion response message 303 to the authentication relay 103 (S107). The source address of the authentication completion response message 303 is set to the authentication client 105, while the destination address is set to the authentication relay 103.

The authentication relay 103 transmits the authentication completion response message 303 to the authentication server 102 in a way that the authentication client information 202 is contained in the authentication completion response message 303 (S108). The source address of the authentication completion response message 303 is set to the authentication relay 103, while the destination address is set to the authentication server 102.

Through the processing described above, the network access authentication process is completed. The authentication client 105 is thereby connected to the network 101 and is thus enabled to perform the communication with the correspondent device. The connection to the network 101 can be established by, concretely, changing filter setting of the authentication relay, distributing a secret key and so on.

In the former case of the filter setting, the authentication server 102 sends instruction data to change the filter setting to the authentication relay 103 so as to permit the authentication client to connect with the network, and the authentication relay 103 changes the filter setting. The authentication server 102 may change the filter setting of not only the authentication relay 103 but also other authentication relays such as the authentication relay 104 belonging to the same authentication domain so as to permit the communication of the authentication client 105.

In the latter case of distributing the secret key, the authentication server 102 distributes the secret key common to the authentication relays 103, 104 to the authentication client 105. In this case, the authentication relays 103, 104 let through the connection of the authentication client 105 having the secret key to the network 101.

Such a case is considered that the authentication client 105, after the completion of the network access authentication, disconnects from the authentication relay 103 for a reason such as deterioration of an environment for radio waves and establishes the connection with the authentication relay 104. Note that the address information such as the IP address and the port of the authentication client 105 connecting with the authentication relay 104 can be changed from those set when connecting with the authentication relay 103.

Figure 4:
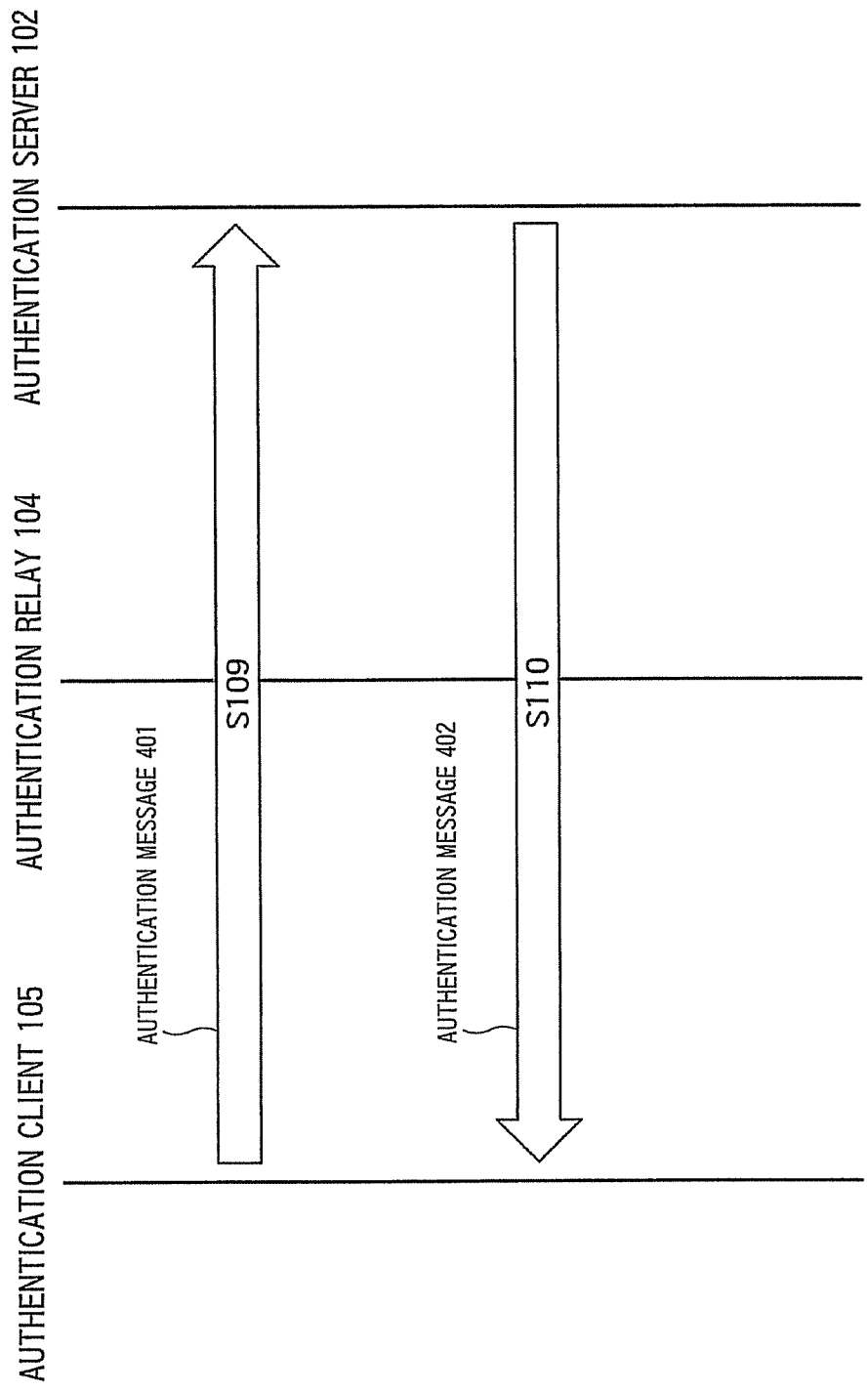
FIG. 4 is a diagram illustrating an outline of how the authentication message is transmitted and received in a re-authentication procedure etc.

FIG. 4 illustrates how the authentication message is transmitted and received after establishing the connection to the authentication relay 104.

The authentication message is transmitted and received for the purpose of executing predetermined processes such as an address update process (address notification process) of updating the address managed by the authentication server 102 by notifying the authentication server 102 of a change of the IP address of the authentication client 105, a re-authentication process and an acknowledgment process. The re-authentication process is periodically conducted, and the authentication client 105 transmits and receives the authentication message illustrated in FIG. 4 even when not moving to the authentication relay 104. The following discussion presumes the case of transmitting and receiving the authentication message for the purpose of notifying of a change of the IP address.

The authentication client 105 acquires the address information (the IP address, the port number, etc.) of the authentication server from the already-received authentication server information 302, and transmits an authentication message 401 directly to the authentication server 102 by employing the acquired address information (S109). The destination address of the authentication message 401 is set to the authentication server 102, while the source address is set to the authentication client 105. The authentication client 105, which is connectable to the network 101 and knows the address information of the authentication server 102, can therefore make the direction transmission to the authentication server 102. The authentication relay 104 lets through the authentication message 401 sent from the authentication client 105 simply to the network 101.

The authentication server 102, when receiving the authentication message 401 from the authentication client 105, obtains the address information such as the IP address and the port number of the authentication client 105 from source information (specifically, the source information of a packet) of the authentication message 401, and updates the stored address information of the authentication client 105. The authentication server 102 generates and transmits an authentication message 402 to the authentication client 105 (S110). Note that in the case of the arrival confirmation process, the authentication message 402 functions as an arrival response message.

Through the processing described above, the authentication client 105 can execute the address update process (the address notification process), the re-authentication process, the acknowledgment process, etc. by performing the direct communication with the authentication server 102 after making the network access authentication. Further, after the network access authentication, the authentication relay 103 and the authentication relay 104 simply let through the authentication message transmitted and received between the authentication server 102 and the authentication client 105, and therefore processing loads on the authentication relay 103 and the authentication relay 104 can be reduced. Moreover, the necessity for transmitting the authentication client information is eliminated, thereby enabling a size of the message transmitted and received on the network to be decreased.

If hitherto done, the authentication client moving to the authentication relay 104, in the case of executing the address update process, the re-authentication process, the acknowledgment process, etc., transmits the authentication message addressed to the authentication relay 103. There is, however, a case of having a configuration that the authentication relay 103 discards the authentication message sent from the authentication client not connected to the authentication relay 103 itself. In this case, at a point of time when the authentication message is forwarded to the authentication relay 103 from the authentication relay 104, the authentication relay 103 discards the authentication message, resulting in a failure in the process described above. Accordingly, the authentication client must newly execute the authentication process with the authentication server under the authentication relay 104 from the beginning. This implies that the processing load on the authentication relay rises, and a data traffic flowing across the network increases. Further, another problem is that it takes a long period of time till the communication resume.

By contrast, according to the first embodiment, the authentication client 105 can perform the communication directly with the authentication server 102 as described above and has therefore no necessity for executing the address update process, the re-authentication process, the acknowledgment process, etc. via the authentication relay. Hence, these processes can be successfully done even under the authentication relay after moving.

Moreover, also in the case of executing the address update process, the re-authentication process, the acknowledgment process, etc. in a status where the authentication client continuously resides as the subordinate under the authentication relay 103, the authentication client performs the communication directly with the authentication server 102 to reduce the load on the authentication relay 108, and then these processes can be executed.

Figure 5:
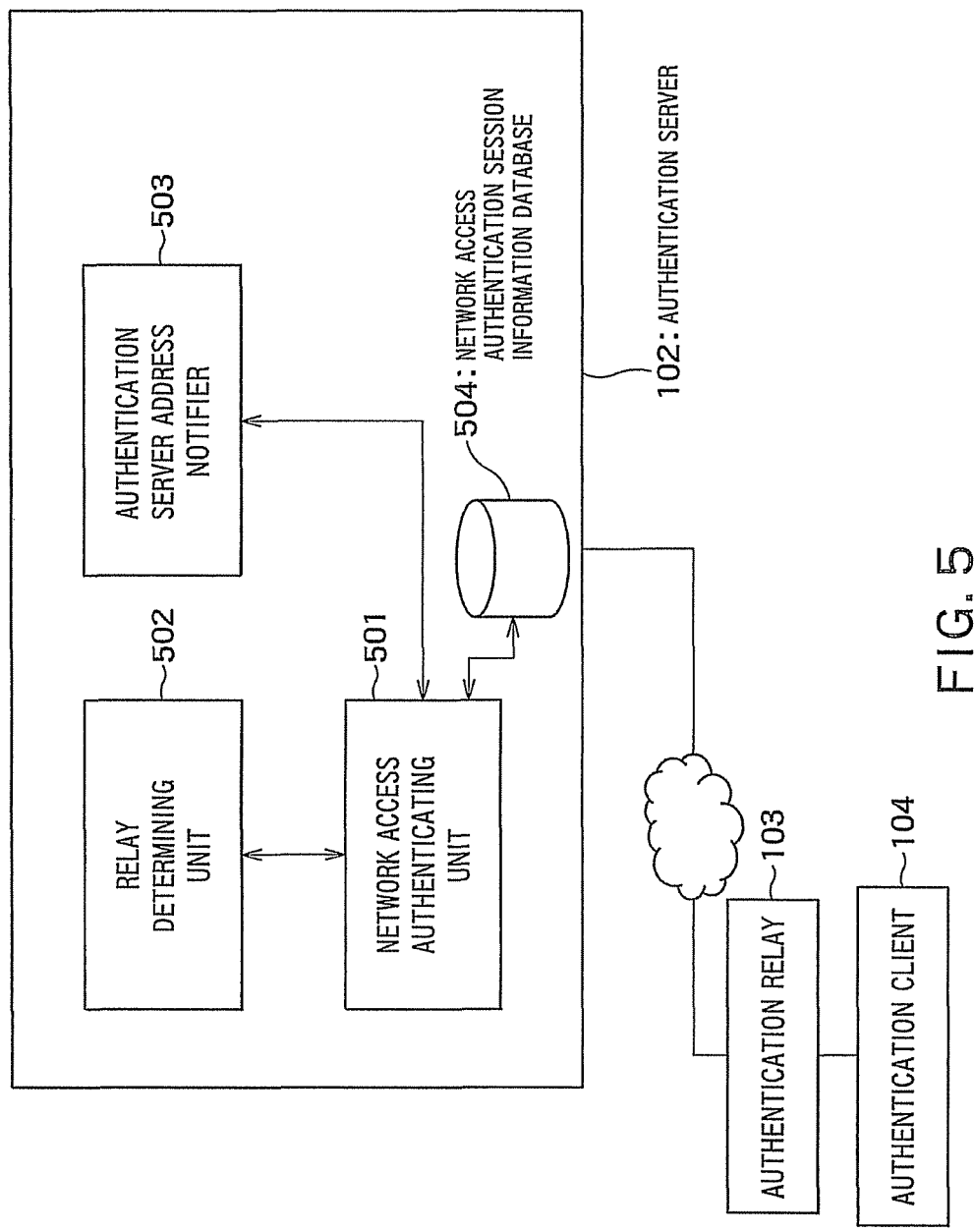
FIG. 5 is a diagram of a configuration of the authentication server according to the first embodiment.

FIG. 5 illustrates a configuration of the authentication server 102 according to one embodiment.

The authentication server 102 includes a network access authenticating unit 501, a relay determining unit 502, an authentication server address notifier 503 and a network access authentication session information database (storage) 504. Though omitted in FIG. 5, the authentication server 102 includes hardware components such as a CPU, a memory and a communication interface and software components such as an operating system (OS) and communication stack software, which are necessary for operating as a communication node.

The network access authenticating unit 501 executes the network access authentication process for the authentication client. To be specific, the network access authenticating unit 501 executes the process defined by RFC5191, the process of the authentication method in use, and the transmission and reception the related authentication messages. The processes given herein include also the address update process and the acknowledgment process.

The relay determining unit 502 determines whether the authentication message received from outside is a message transmitted from the authentication relay or a message transmitted directly from the authentication client. For example, the authentication message is determined to be the message transmitted from the authentication relay if containing the authentication client information whereas the message transmitted directly from the authentication client if not containing. Alternatively, the relay determining unit 502 gets stored with the address information of the authentication relay and the address information of the authentication client respectively, and may make the determination based on whether the source address information of the received authentication message is coincident with the stored address information or not.

The authentication server address notifier 503 notifies, based on a result of the network access authentication process, the authentication client 105 of the authentication server information containing the server address information such as the IP address and the port number of the authentication server and other related items of information. Specifically, if succeeding in the network access authentication process, the authentication completion message 301 to be transmitted to the authentication relay 103 contains the authentication server information (containing the server address information).

The network access authentication session database 504 is stored with status information etc. related to the network access authentication conducted between the authentication server 102 and the authentication client 105. Further, the network access authentication session database 504 is also stored with the address information of the authentication client. Still further, the network access authentication session database 504 may also be stored with the address information of the authentication relays 103, 104.

Through the processing described above, according to the first embodiment, in the network access authentication process making use of the authentication relay, even when the authentication client moves to another authentication relay in the same authentication domain, it is feasible to make successful the re-authentication process etc. for the authentication client. As a result, there is reduced the period of time till the communication can resume after the authentication client has moved to another authentication relay. Moreover, the decrease in network traffic and the reduction in load on the authentication relay can be realized.

Second Embodiment

A second embodiment is different from the first embodiment in terms of the authentication completion message notification process shown in FIG. 3.

Figure 6:
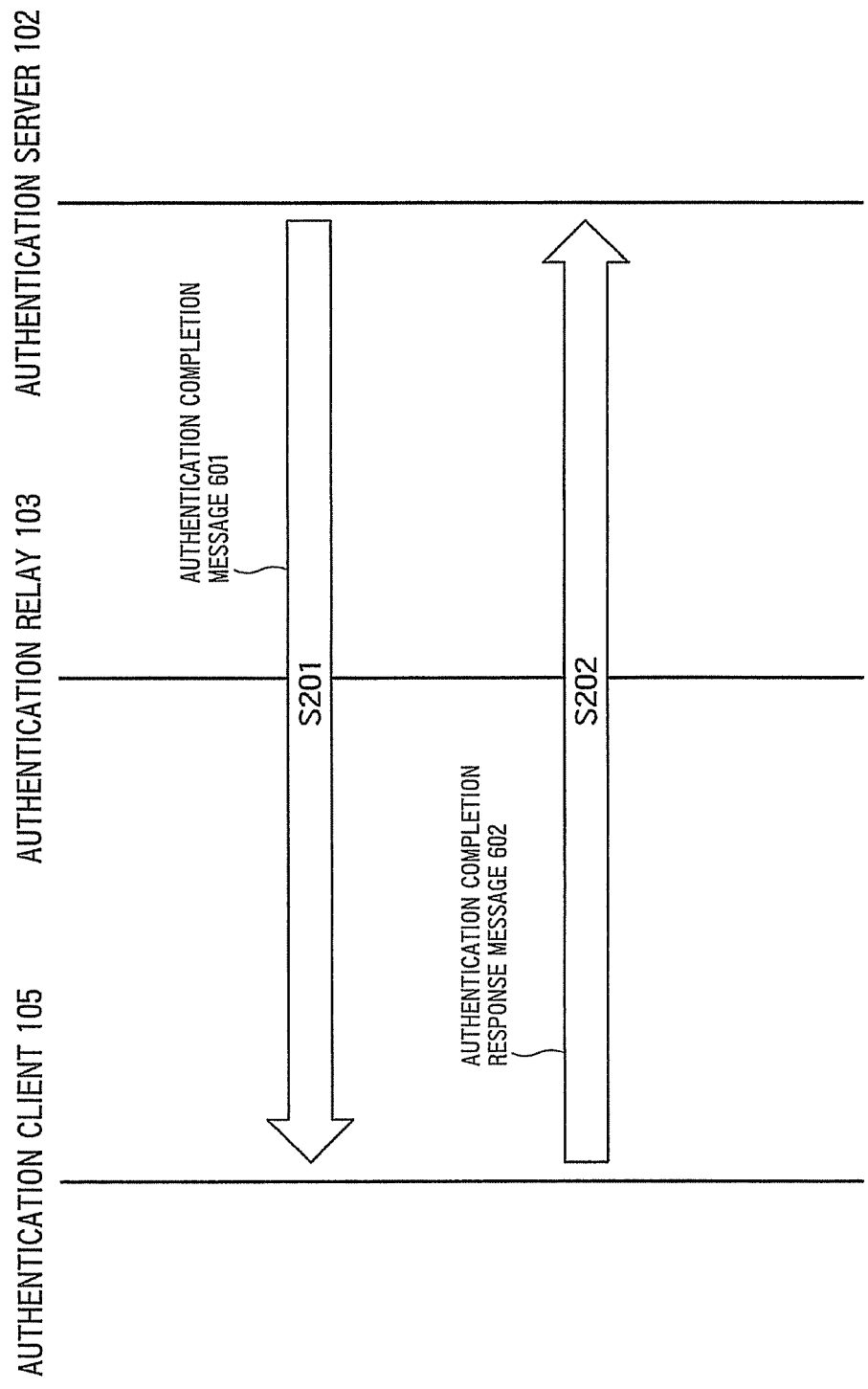
FIG. 6 is a diagram illustrating the notification method of the address information of the authentication server in a second embodiment.

FIG. 6 illustrates a flow of the authentication completion message notification process in the second embodiment.

The authentication server 102 transmits an authentication completion message 601 directly to the authentication client 105 (S201). For attaining this direct transmission, even before completing the network access authentication, the authentication server 102 needs being enabled to perform the direct communication with the authentication client 105. The authentication server 102 needs to know the address information such as the IP address and the port number of the authentication client 105 in order to perform the direction communication with the authentication client 105. The IP address and the port number of the authentication client 105 may be acquired from the authentication client address information 202 and may also be, if implicitly presumable from the authentication client address information 202, acquired based on the presumption. In any case, the method of acquiring the IP address of the authentication client is not limited to those described above. Note that the authentication server 102 previously implements the filter setting or distributes the secret key at a stage of succeeding in the authentication so as to enable the authentication client 105 to connect with the network.

Further, the authentication client 105 transmits an authentication completion response message 602 directly to the authentication server 102 (S202). The address information of the authentication server 102 may be acquired from the source information of the authentication completion message 601. That is, the authentication server 102 notifies the authentication client of the address information of the authentication server 102 by transmitting the authentication completion message 601 directly to the authentication client. In this case, the authentication server address notifier 503 corresponds to a function of writing the packet source address information contained in the authentication completion message 601 to the packet. Note that the authentication completion message 601 may contain the authentication server information separately.

Through the processing described above, according to the second embodiment, the authentication client is directly notified of the address information of the authentication server, and hence the load on the authentication relay can be reduced.

Third Embodiment

A third embodiment is different from the first embodiment in terms of the authentication completion message notification process shown in FIG. 3.

FIG. 7 illustrates a flow of the authentication completion message notification process in the third embodiment.

The authentication server 102 transmits an authentication completion message 701 to the authentication relay 103 (S301). The authentication completion message 701 contains the authentication client information 202.

The authentication relay 103 transmits the authentication completion message 701 to the authentication client 105 in a manner that removes the authentication client information 202 therefrom (S302).

The authentication client 105 transmits an authentication completion response message 702 as a response to the authentication completion message 701 to the authentication relay 103 (S303).

The authentication relay 103 transmits an authentication completion response message 702 to the authentication server 102 in a way that the authentication client information 202 is contained in this message 702 (S304). The network access authentication is thereby completed.

Next, the authentication server 102 transmits an arrival confirmation message 703 to the authentication relay 103 (S305). At this time, the arrival confirmation message 703 contains the authentication client information 202 and authentication server information 704.

The authentication relay 103 transmits the arrival confirmation message 703 containing the authentication server information 704 to the authentication client 105 (S306).

The authentication client 105 transmits an arrival response message 705 directly to the authentication server 102 by use of the received authentication server information 704 (S307).

The arrival response message 705 is transmitted directly to the authentication server 102, thereby reducing the load on the authentication relay.

Fourth Embodiment

A fourth embodiment is different from the third embodiment in terms of the authentication completion message notification process shown in FIG. 7.

FIG. 8 illustrates a flow of the authentication completion message notification process in the fourth embodiment.

To start with, similarly to the third embodiment, the authentication server 102 transmits an authentication completion message 801 to the authentication relay 103 (S401).

The authentication completion message 801 contains the authentication client information 202.

The authentication relay 103 transmits the authentication completion message 801 to the authentication client 105 in a way that removes the authentication client information 202 therefrom (S402).

The authentication client 105 transmits an authentication completion response message 802 as a response to the authentication completion message 801 to the authentication relay 103 (S403).

The authentication relay 103 transmits the authentication completion response message 802 in a manner that the authentication client information 202 is contained in the message 802 (S404). The network access authentication is thereby completed.

In the fourth embodiment, after the network access authentication, the authentication server 102 transmits an arrival confirmation message 803 directly to the authentication client 105 (S405). At this time, in addition to the method of making use of the authentication client information 202 exemplified in the second embodiment with respect to the IP address of the authentication client 105, another method is considered, which uses information of a routing protocol. In any case, the method of acquiring the IP address of the authentication client 105 is not limited to those exemplified herein.

Hereafter, the authentication client 105 transmits an arrival response message 804 directly to the authentication server 102 (S406). The address information of the authentication server 102 may be acquired from the source information of an arrival confirmation message 803.

Through the processing described above, according to the fourth embodiment, the acknowledgment message is transmitted directly to the authentication client 105 from the authentication server 102, thereby enabling the load on the authentication relay to be reduced.

Fifth Embodiment

A fifth embodiment is that the authentication server 102 notifies the authentication client 105 of plural items of authentication server information in the configurations of the first and third embodiments. All items of authentication server information to be notified may be a plurality of IP addresses set in the authentication server 102 or may also be the IP address etc. of the authentication server 102 and an IP address etc. of a standby authentication server 502. The plural items of authentication server information are not limited to those described above. Further, the authentication server information may contain auxiliary information such as values etc. representing priority levels among the plurality of IP addresses.

Owing to the notification of the plurality of IP addresses etc., the re-authentication process etc. can be executed between the authentication client and the standby authentication server even if the authentication server 102 (active server) gets disabled from operating. Alternatively, even when one of the network communication units of the authentication server 102 gets into a fault, the communication with the authentication server 102 can continue by use of a preparatory network communication unit to which another IP address is allocated.

The authentication server described above may also be realized using a general-purpose computer device as basic hardware. That is, processing on the blocks of the authentication server can be realized by causing a processor mounted in the above described computer device to execute a program. In this case, the server may be realized by installing the above described program in the computer device beforehand or may be realized by storing the program in a storage medium such as a CD-ROM or distributing the above described program over a network and installing this program in the computer device as appropriate. Furthermore, the database in the authentication server may also be realized using a memory device or hard disk incorporated in or externally added to the above described computer device or a storage medium such as CD-R, CD-RW, DVD-RAM, DVD-R as appropriate.

The invention claimed is:

1. An authentication server comprising:
a processor configured to receive a first authentication message, an authentication relay connected to a network transmits instead of a communication device, via the network, and execute network access authentication process on the communication device based on the first authentication message wherein, the communication device exists under the authentication relay and is not permitted to connect to the network before the network access authentication process on the communication device succeeds, and the first authentication message includes information for identifying the communication device, a source address of the first authentication message is an address of the authentication relay and a destination address of the first authentication message is an address of the authentication server; and
to transmit a message, the message includes the server's address information and said information for identifying the communication device, to a predetermined one of the authentication relay and the communication device, when the network access authentication succeeds, wherein the communication device is permitted to connect to the network via the authentication relay after the network access authentication process succeeds,
wherein when the network access authentication process succeeds on the communication device, the processor is configured to transmit instruction data to change a filtering setting to the authentication relay and another authentication relay belonging to same authentication domain as that of the authentication relay so as to permit that the communication device is connected to the network via the authentication relay and said other authentication relay, respectively.

2. The authentication server according to claim 1, wherein the message transmitted to the predetermined one of the authentication relay and the communication device is an authentication completion message.

3. The authentication server according to claim 1, wherein the network access authenticating unit receives a second authentication message requesting to execute a predetermined process from the communication device and executes the predetermined process.

4. The authentication server according to claim 3, wherein the predetermined process is a re-authentication process of the communication device, an address update process of the communication device or an arrival confirmation process of the communication device.

5. The authentication server according to claim 1, wherein the address notifying unit notifies plural items of server address information.

6. The authentication server according to claim 1, wherein the address notifying unit notifies of address information of a standby authentication server in addition to the server's address information.

7. The authentication server according to claim 1, wherein, in the event that the address notifying unit transmits the message to the authentication relay, a source address of the message is an address of the server and a destination address of the message is an address of the authentication relay and conversely, in the event that the address notifying unit transmits the message to the communication device, a source address of the message is an address of the server and a destination address of the message is an address of the communication device.

8. An authentication method comprising:
receiving a first authentication message, an authentication relay connected to a network transmits instead of a communication device, via the network, and execute network access authentication process on the communication device based on the first authentication message, wherein the communication device exists under the authentication relay and is not permitted to connect the network before the network access authentication process on the communication device succeeds, and the first authentication message includes information for identifying the communication device, a source address of the first authentication message is an address of the authentication relay and a destination address of the first authentication message is an address of the authentication server; and transmitting a message, the message includes the server's address information and said information for identifying the communication device, when the network access authentication process succeeds, wherein the communication device is permitted to connect to the network via the authentication relay after the network access authentication process succeeds, wherein when the network access authentication process succeeds on the communication device, instruction data is transmitted to change a filtering setting to the authentication relay and another authentication relay belonging to same authentication domain as that of the authentication relay so as to permit that the communication device is connected to the network via the authentication relay and said other authentication relay, respectively.

9. A non-transitory computer readable medium having instructions stored therein which when executed by a processor, causes the processor to execute steps comprising:

receiving a first authentication message, an authentication relay connected to a network transmits instead of a communication device, via the network, and execute network access authentication process on the communication device based on the first authentication message, wherein the communication device exists existing under the authentication relay and is not permitted to connect the network before the network access authentication process on the communication device succeeds and the first authentication message includes information for identifying the communication device, a source address of the first authentication message is an address of the authentication relay and a destination address of the first authentication message is an address of the authentication server; and transmitting a message, the message includes the server's address information and said information for identifying the communication device, to a predetermined one of the authentication relay and the communication device, when the network access authentication process succeeds, wherein the communication device is permitted to connect to the network via the authentication relay after the network access authentication process succeeds, wherein when the network access authentication process succeeds on the communication device, instruction data is transmitted to change a filtering setting to the authentication relay and another authentication relay belonging to same authentication domain as that of the authentication relay so as to permit that the communication device is connected to the network via the authentication relay and said other authentication relay, respectively.

* * * * *